Figure 1:
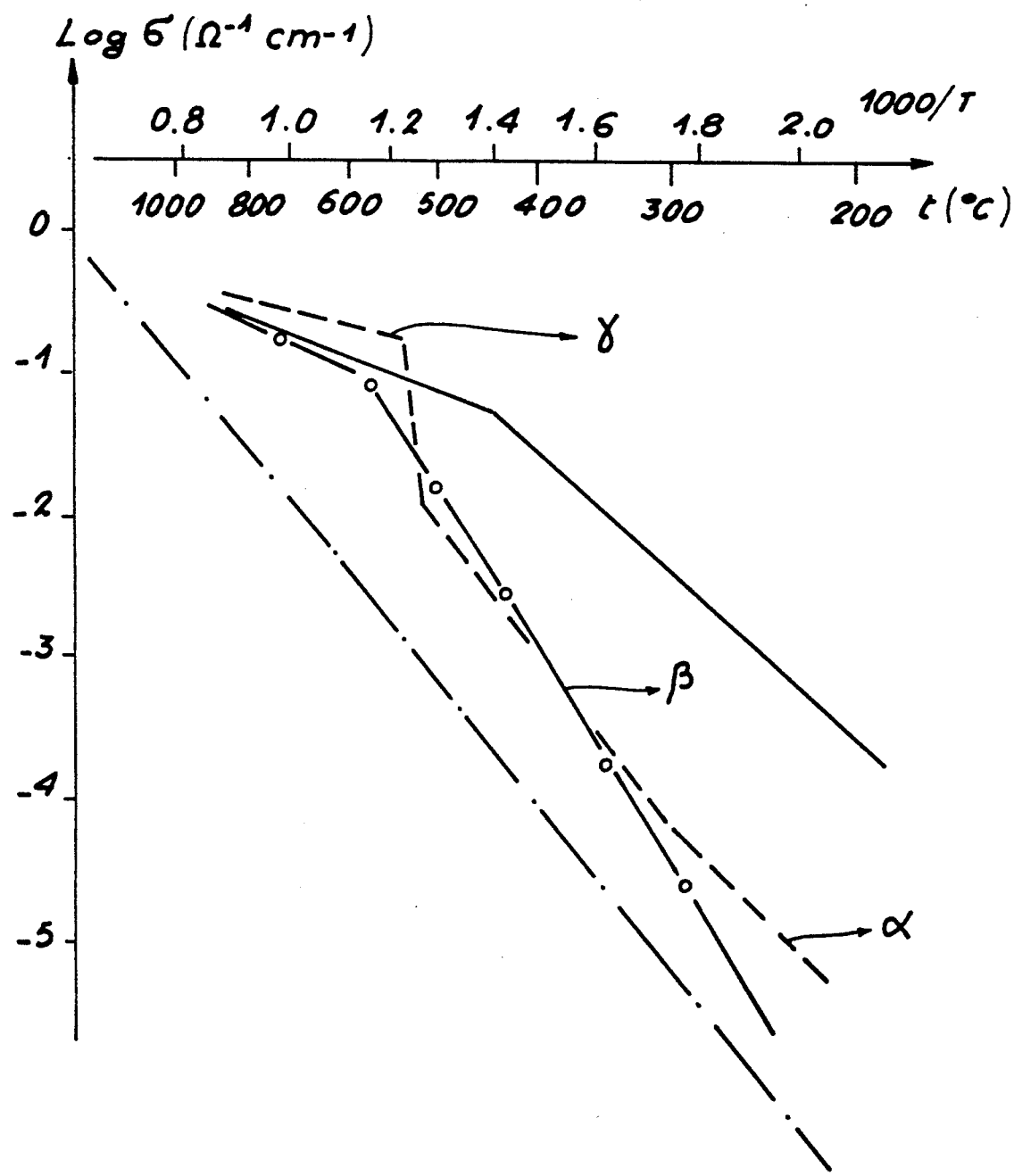

United States Patent [19]

Abraham et al.

[11] Patent Number: 5,227,257
[45] Date of Patent: Jul. 13, 1993

[54] COMPOSITIONS DERIVED FROM BI4V2O11

[75] Inventors: Francis Abraham, Genech; Jean-Claude Boivin, Wattrelos; Gaétan Mairesse, Lambersart; Guy Nowogrocki, Lille; Michel Kleitz; Jacques Fouletier, both of Grenoble, all of France

[73] Assignee: Universite Des Sciences Et Techniques De Lille Flandres Artois Ecole Nationale Superieure De Chimie De Lille Institut National Polytechnique De Grenoble, France

[21] Appl. No.: 838,731
[22] PCT Filed: Jul. 18, 1990
[86] PCT No.: PCT/FR90/00543
 § 371 Date: Mar. 16, 1992
 § 102(e) Date: Mar. 16, 1992
[87] PCT Pub. No.: WO91/01274
 PCT Pub. Date: Feb. 7, 1991

[30] Foreign Application Priority Data

Jul. 18, 1989 [FR] France ............... 89 09649

[51] Int. Cl.$^5$ ............................................. H01M 8/00
[52] U.S. Cl. ..................................... 429/80; 252/518; 252/521; 429/33; 429/46; 429/188; 429/191; 429/193
[58] Field of Search ............... 252/518, 521; 429/30, 429/33, 46, 188, 191, 193

[56] References Cited

U.S. PATENT DOCUMENTS 4,675,260 6/1987 Sakurai et al. ............... 429/191

FOREIGN PATENT DOCUMENTS 0239526 9/1987 European Pat. Off. .

OTHER PUBLICATIONS

Abraham et al. "Phase Transistions and Ionic Conductivity in $Bi_4Y_2O_{11}$ ... " Solid State Ionics, vol. 28-30, pp. 529-532 (1988).
Proceedings of the Sixth International Meeting on Ferroelectricity, Kobe, 1985, Japanese Journal of Applied Physics, vol. 24, suppl. 24-2, 1985, pp. 625-627; A. A. Bush et al.
Solid State Ionics, vol. 28-30, 1988, pp. 529-532, Elsevier Science Publishers B.V., North-Holland, Amserdam, N.L.; F. Abraham et al.
Patent Abstracts of Japan, vol. 12, n 165 (C-496) (3012), 18 May, 1988.
Patent Abtracts of Japan, vol. 8, n 156 (C234); JP-A-59 57 915 (Shingijiyutu Kaihatsu Jigiyoudan) Mar. 4, 1984.
Chemical Abstracts, vol. 150, No. 4, 28 Jul. 1986, p. 606, abstract No. 33123g Columbus, Ohio, U.S.; A. A. Bush.
Chemial Abstracts, vol. 107, No. 18, 2 Nov. 1987, p. 852, abstract No. 166848k, Columbus, Ohio, U.S.; V. G. Osipyan et al.
Chemical Abstracts, vol. 110, No. 12, 20 Mar. 1989, p. 497, abstract No. 102665c, Columbus, Ohio, U.S.: V. Koshelyaeva et al.
Chemical Abstracts, vol. 110, No. 14, 3 Apr. 1989, p. 779, abstract No. 125933c, Columbus, Ohio, U.S.; F. Abraham et al.
Chemical Abstracts, vol. 110, No. 26, 26 Jun. 1989, p. 651, abstract No. 241047r, Columbus, Ohio, U.S.; V. N. Borisov et al.

*Primary Examiner*—Paul Liederman
*Assistant Examiner*—M. Kopec
*Attorney, Agent, or Firm*—Nixon & Vanderhye

[57] ABSTRACT

The compositions are derived from $Bi_4V_2O_{11}$ and are characterized by the fact that at least one of the elements present is substituted, the substituting element(s) being such that the structural nature of the gamma phase of $Bi_4V_2O_{11}$ is maintained, as well as the equilibrium of the loads.

6 Claims, 4 Drawing Sheets

COMPOSITIONS DERIVED FROM BI4V2O11

The object of the invention is novel compositions derived from $Bi_4V_2O_{11}$ and their electrochemical applications, in particular as electrolytes which conduct by means of $O^{2-}$ (oxide) anions.

A solid electrolyte conducting by means of $O^{2-}$ anions is a material in which the $O^{2-}$ anions or the vacancies can move in a coordinated manner under the effect of an external stress such as an electric field or a partial pressure difference of oxygen.

The materials currently available are essentially derivatives of zirconium oxide $ZrO_2$, stabilized by divalent oxides such as CaO or by trivalent oxides such as $Y_2O_3$ (R. M. Dell et al., Solid electrolytes, ed. by P. Hagenmuller and W. Van Gool, Academic Press) or, better still, derivatives of $Bi_2O_3$ stabilized mainly by oxides of rare earth metals such as $Er_2O_3$ (M. J. Verkerk et al., Journal of Applied Electrochemistry 10 (1980) 81-90, These latter have conductivities of the order of $10^{-1}$ $\Omega$ cm$^{-1}$ at 600° C., but their performance falls off rapidly with temperature (see FIG. 1).

The stabilized $ZrO_2$ and $Bi_2O_3$ oxides possess the same basic structure, derived from the so-called fluorite structural type, in which the $O^{2-}$ sites exhibit vacancies which allow the movement of anions, which is hence a three-dimensional structure.

A high conductivity, even higher than $10^{-1}$ $\Omega^{-1}$ cm$^{-1}$, has been observed in the gamma phase of $Bi_4V_2O_{11}$, above about 550° C. (see FIG. 1).

This compound possesses three structural domains, alpha, beta and gamma. The structural changes which occur during the phase transitions on cooling cause falls in the conductivity during the transformations gamma→beta, followed by beta→alpha.

The gamma phase in $Bi_4V_2O_{11}$ is characterized by a series of layers of $Bi_2O_2^+$, alternating with lamellae of formula $VO_{3.5}^{2-}$.

The $Bi_2O_2^{2+}$ layers are constituted of oxygen atoms arranged in the same plane at the corners of adjacent squares, the bismuth atoms being situated alternately above and below these squares. Between two $Bi_2O_2^{2+}$ layers a lamella constituted by the oxygenated polyedra of vanadium is intercalated, linked through apices and extending in a plane parallel to that of the $Bi_2O_2^{2+}$; these lamellae contain vacancies for oxygen. The inventors have now observed that by partially substituting at least one of the constitutive elements of $Bi_4V_2O_{11}$, it is possible to stabilize the gamma phase chemically.

The object of the invention is thus to provide novel compositions derived from $Bi_4V_2O_{11}$, which have an improved conductivity compared with that of the known oxides used hitherto as electrolytes.

It also relates to the provision of an easily implementable process for their production.

The invention also relates to taking advantage of the high conductivity properties of the novel compositions derived from $Bi_4V_2O_{11}$ for the development of electrolytes which depend on conduction by $O^{2-}$ ions.

The compositions of the invention are derivatives of $Bi_4V_2O_{11}$ in which at least one of the constitutive elements is partially replaced, the substituting element(s) being such that the structural type of the gamma phase of $Bi_4V_2O_{11}$ is maintained as well as is the balance of the charges.

The compositions of the invention are more particularly characterized in that they correspond to the formula (I):

$$(Bi_{2-x}M_xO_2)(V_{1-y}M'_yO_z) \qquad (I)$$

in which:

M represents one or more replacement metals for Bi, selected from those having an oxidation number lower than or equal to 3, M' represents one or more replacement elements for V selected from those having an oxidation number lower or equal to or higher than 5, the limiting values of x, y and hence z being functions of the nature of the replacement elements M and M'.

The partial replacement of the constitutive elements of $Bi_4V_2O_{11}$ as defined above stabilizes the structural type of the gamma phase and maintains a proportion of vacancies in the $O^{2-}$ ion network sufficient to make possible anionic conductivity. Hence, conductance is essentially two-dimensional, since the oxygen atoms of the $Bi_{2-x}M_xO_2$ layers are tightly bound to the bismuth atoms and can not move.

The anionic conductivity of these phases is remarkable since it attains $10^{-3}$ $\Omega^{-1}$ cm$^{-1}$ at about 200° C., which is of the order of one hundred times higher than the performance of the best materials currently available on the market (see FIG. 1).

A preferred family of compositions according to the invention is constituted by derivatives of $Bi_4V_2O_{11}$ in which only the vanadium atom is partially replaced by one or more elements. These compositions correspond to the formula (II):

$$(Bi_2O_2)(V_{1-y}M'_yO_z) \qquad (II)$$

in which M' is as defined above, y being other than zero.

M' is advantageously selected from alkali and alkaline earth metals, transition metals or even elements of the groups III to V of the Periodic Table, or from the rare earths.

Compositions of great stability and high conductivity at low temperature include as replacement metal for vanadium a transition metal such as Zn, Cu, Ni, Co, Fe, Mn and Cd.

As an alternative, M' is an alkaline earth metal selected from Ca, Sr and Ba.

In another variant, M' is a metal having an oxidation level equal to 3. Useful metals include, in particular, Sb, In and Al.

In yet another variant, M' has a oxidation level of 4. Examples of such metals are Ti, Sn or Ru.

M' may also represent a substitution element with an oxidation level equal to 5 such as Nb, Ta or P.

M' may also be a rare earth metal.

In another embodiment, M' is an alkali metal such as sodium or may represent Pb with an oxidation level of 2.

In another preferred family of the invention, only the bismuth atom is partially replaced by one or more metals. These derivatives correspond to the formula (III):

$$(Bi_{2-x}M_xO_2)(VO_2) \qquad (III)$$

in which M is as defined above, x being other than zero.

In particularly preferred compositions of this family, M is selected from rare earth metals.

Advantageously, M represents lanthanum.

Another preferred family of compositions of the invention corresponds to derivatives of formula (I) above in which the oxygen atom is partially replaced by fluorine.

Other compositions which are also valuable are composed of mixed replacements of bismuth and vanadium and are represented by formula (I) above in which x and y are other than zero.

As a composition of this type, mention may be made of:

$$(Bi_{2-x}Pb_xO_2)(V_{1-y}Mo_yO_z)$$

Stabilization of the structural type of the gamma phase of $Bi_4V_2O_{11}$ is observed for values of x and y included between approximately 0.1 and 0.23.

The invention also relates to a process for the manufacture of the compositions defined above.

According to this process, a mixture of the oxides of bismuth, vanadium and the element M and/or M', used in suitable amounts depending on the degree of oxidation of M and M', is heated to an appropriate temperature, advantageously of the order of 600° C. for 10 to 15 hours. The mixture is then ground, then heated to a higher temperature, advantageously of the order of 700° to 800° C. for 10 to 15 hours, the heating-grinding cycle being repeated if necessary until the desired phase is produced.

In a variant of the process, it is possible to replace all or part of the constituents of the starting mixture by compounds leading by thermal decomposition to the in situ formation of the oxides. Such compounds may be advantageously selected from: carbonates, nitrates, ammonium salts, oxalates, acetates or alkoxides.

The purity of the phases produced is checked by X-ray diffraction on the powder.

In view of their high conductivity properties, the novel compounds of the invention are particularly suited for the development of solid electrolytes.

These electrolytes are particularly efficient in the so-called the low temperature field, namely below 500° C., a field in which the systems based on the conductors hitherto known which use $O^{2-}$ are rather inefficient.

The invention also relates to the electrochemical uses of these compositions and to the "all-solid" electrochemical devices containing them as electrolytes.

They are also particularly suited to the development, in particular, of oxygen gauges, amperometric sensors or also membranes for the electrochemical separation of gaseous oxygen which make possible oxygen enrichment.

Membranes produced according to the technology described in Solid State Ionics 28-30 (1988), 524-528 by Dumélié M et al. are particularly appropriate candidates.

The compositons of the invention can also be used in fuel cells ($O_2$-$H_2$ or CO).

In these applications, the compositions of the invention can be used in the form of sintered ceramic material, thin layers or films obtained by overhardening.

Other characteristics and advantages of the invention will become apparent in the example which follows and by making reference to the FIGS. 1 to 4 which show the conductivity curves (log $\sigma$ in $\Omega^{-1}$ cm$^{-1}$) as a function of temperature (1000/T or temperature in °C.) of the compositions of the invention.

The properties of conduction were characterized by impedance spectrometry, by measuring the transport number of the $O^{2-}$ oxide ions (t) by means of the e.m.f. method.

The structural determinations were made by means of X-ray diffraction on the monocrystal.

EXAMPLE: PREPARATION OF COMPOSITIONS DERIVED FROM $Bi_4V_2O_{11}$ IN WHICH THE VANADIUM IS REPLACED BY A METAL M'

When the vanadium is replaced by a metal M' with an oxidation level equal to 2, the following reaction is carried out:

$$Bi_2O_3 + (1-y_2)V_2O_5 + yM'O \cdots$$

$$Bi_2V_{1-y}M_y'O_{3+5(1-y2)+y}, \text{ i.e.}$$
$$Bi_2V_{1-y}M_y'O_{(5.5-3y2)}$$

An advantageously selected value of y for this example is y=0.1, leading to the composition $Bi_2V_{0.9}M_{0.1}'O_{5.35}$ The starting oxides used in the stoichiometry of the above scheme are ground, intimately mixed, then heated to a temperature of 600° C. in a golden boat for about 12 hours.

The mixture is then ground again and heated to 800° C. for about 12 hours, still in the golden boat.

Several oxides M'O used in a mixture with $Bi_2O_3$ and $V_2O_5$ are given hereafter: ZnO, CuO, NiO, CoO, CaO, SrO, BaO, PbO The structural determinations by X-ray diffraction on a monocrystal:

1°) of $Bi_2 V_{0.9} Cu_{0.1} O_{5.35}$ at room temperature

2°) of $Bi_4 V_2 O_{11}$ at high temperature (gamma phase 610° C.) enable the basic characteristics of the structural type to which the compounds of the present invention refer to be described.

RESULTS OF THE REFINEMENT

1°) $Bi_2 V_{0.9} Cu_{0.1} O_{5.35}$
parameters of unit cell a=3.907 (1); c=15.408 (11) Å
space group I4/m m m

| ATOMS | TYPE OF SITE | OCCUPATION OF THE SITE | x | y | z | B |
|---|---|---|---|---|---|---|
| Bi(1) | 16m | ¼ | 0.0430(9) | 0.0430 | 0.1659(3) | 3.4(1) |
| Bi(2) | 4e | ¼ | 0 | 0 | 0.1705(1) | 1.23(2) |
| (V, Cu) | 8h | ¼ | 0.0524(8) | 0.0524 | ¼ | 1.14(8) |
| O(1) | 4d | 1 | 0 | ½ | ¼ | 2.5(2) |
| O(2) | 16m | ¼ | 0.084(7) | 0.084 | 0.400(2) | 6.1(1) |
| O(3) | 8g | 0.3375 | 0 | ½ | 0.037(2) | 5.8(9) |

COMMENTS

1/The product of the figures appearing in the 2 columns "type of site" and "occupation of the site" expresses the stoichiometry of the material:

| | | | |
|---|---|---|---|
| Bi(1) | 16 × ⅛ = 2 | | |
| Bi(2) | 4 × ½ = 2 i.e. 4Bi | | |
| (V, Cu) | 8 × ¼ = 2 i.e. 2 V, Cu | | |
| | | | $Bi_4(V, Cu)_2O_{10.7}$ |
| O(1) | 4 × 1 = 4 | | |
| O(2) | 16 × ¼ = 4 i.e. 10.70 | | |
| O(3) | 8 × 0.3375 = 2.7 | | |

2/A refinement of identical quality is obtained by localizing Bi(1) at a site of the 16n type (x, O, z) with a degree of occupation of ⅛ (which leads to x=0.061(1) and z=0.1658(3)).

2°) gamma phase $Bi_4 V_2 O_{11}$, 610° C.

parameters of unit cell a=3.98 c=15.42 A; same space group I4 /m m m

RESULTS OF THE REFINEMENT

| ATOMS | TYPE OF SITE | OCCUPATION OF SITE | x | y | z | B |
|---|---|---|---|---|---|---|
| Bi(1) | 16m | ⅛ | 0.053(2) | 0.053 | 0.1640(6) | 3.0(3) |
| Bi(2) | 4e | ½ | 0 | 0 | 0.1731(6) | 2.1(1) |
| (V) | 8h | ¼ | 0.041(5) | 0.04 | ½ | 3.3(4) |
| O(1) | 4d | 1 | 0 | ½ | ¼ | 3.1(4) |
| O(2) | 4e | 1 | 0 | 0 | 0.414(5) | 14(2) |
| O(3) | 8g | 0.375 | 0 | ½ | 0.027(5) | 9(3). |

The comments 1) and 2) are also valid.

These results make it possible to refer to an idealized structure belonging to the space group I4 /m m m (with parameters close to a=3.9 and c=15.4 A in which the atoms occupy the following sites:

| ATOMS | TYPE OF SITE | x | y | z |
|---|---|---|---|---|
| (Bi, M) | 4e | 0 | 0 | ~0.17 |
| (V, M¹) | 2b | 0 | 0 | ½ |
| O(1) | 4d | 0 | ½ | ¼ |
| O(2) | 4e | 0 | 0 | ~0.4 |
| O(3) | 4c | 0 | ½ | 0 |

The materials which are the object of the present invention possess a structure derived from this idealized description with possibly:
  deviations around these positions,
  the loss of one or more symmetry elements,
  a multiplication of the cell parameters.

The degrees of occupation of the sites O(2) and O(3) are functions of the nature, the degree of substitution and the oxidation levels of the elements M and M'.

The FIGS. 1 to 4 show the conductivity curves as a function of the various oxygen conductors.

FIG. 1 shows the conductivity log σ in $\Omega^{-1} cm^{-1}$ as a function of:

1000/T, or of the temperature in °C. of $Bi_2V_{0.9} Cu_{0.1}O_{5.35}$ (curve —), and for comparison $Bi_4V_2O_{11}$ (curve - - - ), and the stabilized oxides $(ZrO_2)_{0.9} (Y_2O_3)_{0.1}$ (curve —.—.— and $(Bi_2O_3)_{0.8} (Er_2O_3)_{0.2}$ (curve —o—o—).

Examination of these curves shows that, compared with those of the prior art, the high values of the conductivity of the compositions of the invention are maintained when the temperature falls.

Figure 2:
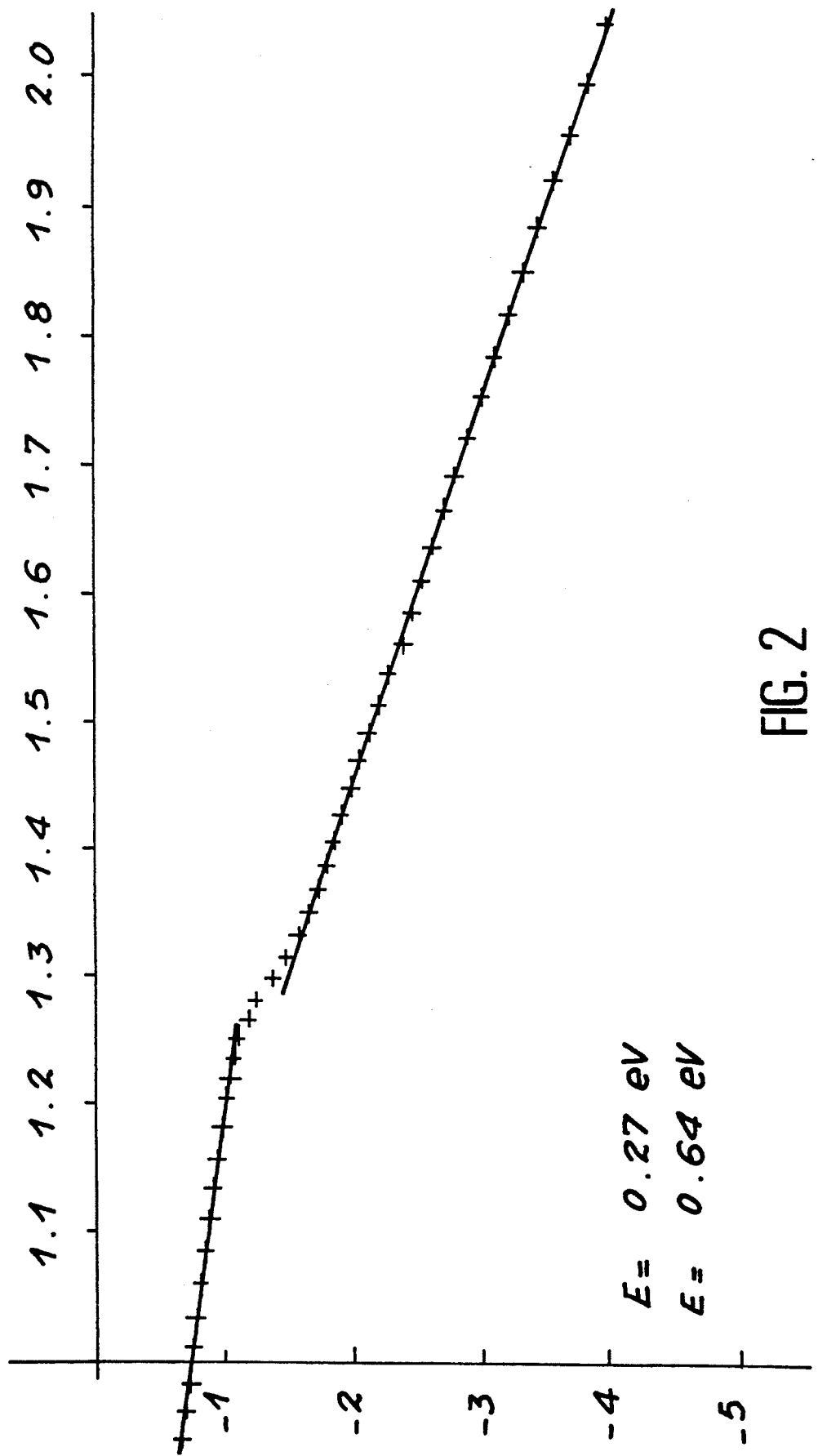
Figure 3:
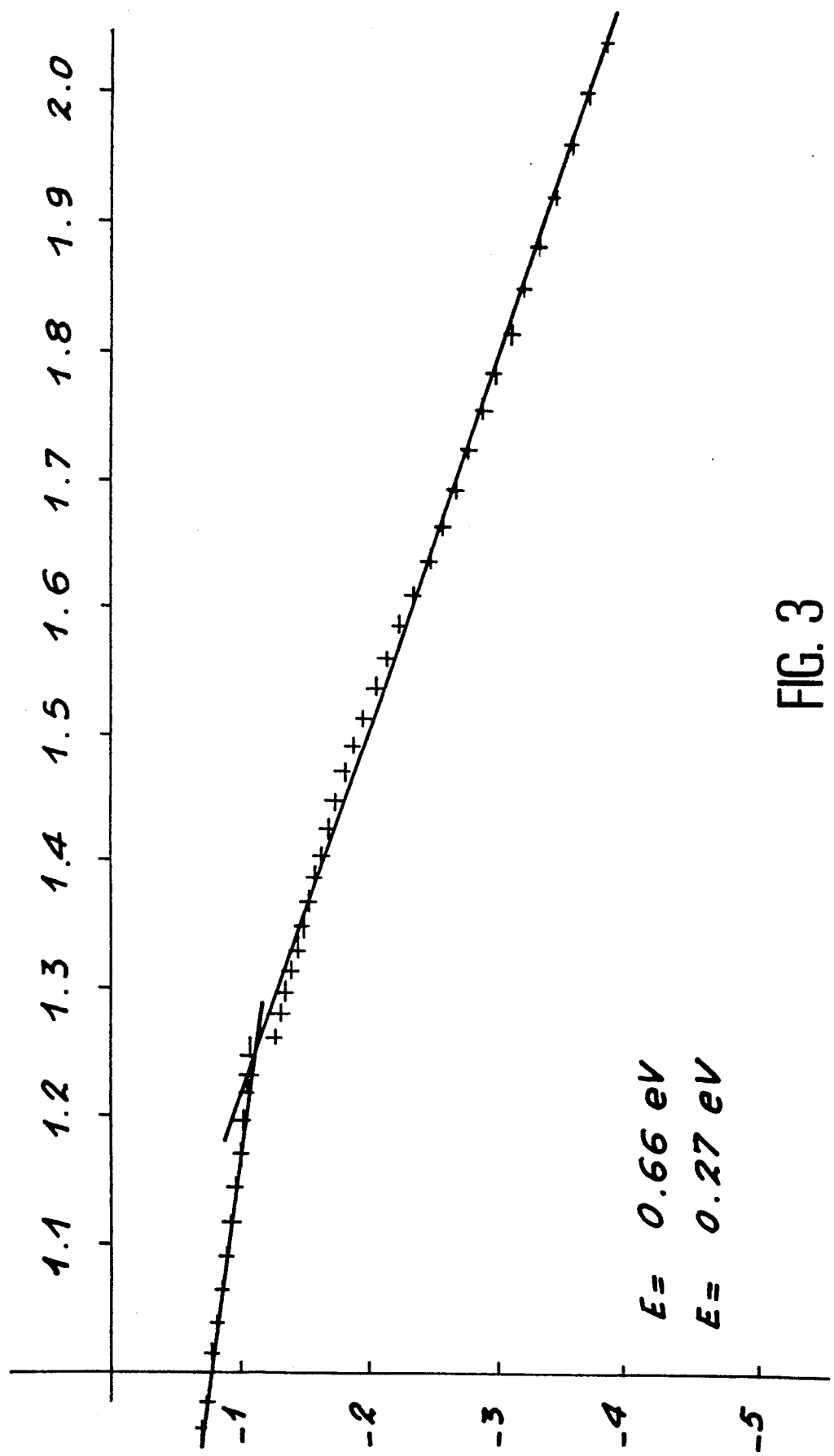
Figure 4:
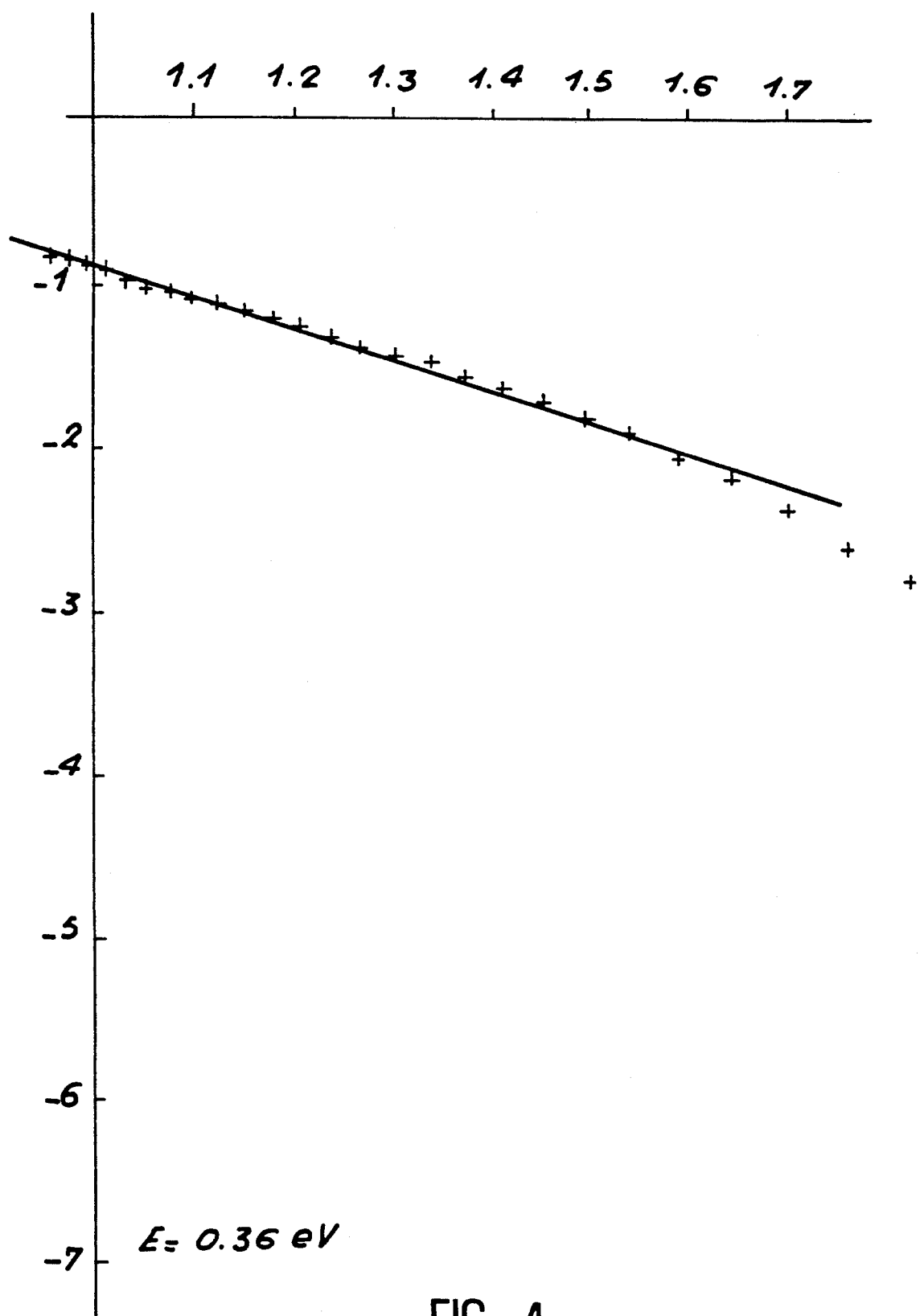

The FIGS. 2, 3 and 4 present examples of conductivity curves as a function of 1000/T with $Bi_2 V_{0.9} Zn_{0.1} O_{5.35}$, $Bi_2V_{0.9}Ni_{0.1} O_{5.35}$ and $Bi_2 V_{0.9} Cu_{0.1}O_{5.35}$, respectively.

Examination of these different curves demonstrates the high conductivity properties of the compositions of the invention which are maintained in a satisfactory manner when the temperature falls.

We claim:

1. Compositions derived from $Bi_4V_2O_{11}$, characterized in that at least one part of the constitutive elements selected from Bi and V is partially replaced, the substituent element(s) being such that the structure of the gamma phase of $Bi_4V_2O_{11}$ is maintained as well as the balance of charges and proportions of vacancies sufficient to allow anionic conductivity, further characterized in that the modified compound corresponds to the formula (I):

$$(Bi_{2-x}M_xO_2)(V_{1-y}M_y'O_z) \qquad (I)$$

in which:
  M represents one or more metals which can substitute for Bi, selected from those having an oxidation number lower than or equal to 3,
  M' represents one or more elements which may substitute for V selected from the group consisting of alkali and alkaline earth metals, the transition metals, group IIIa metals to Va or IIIb metals to Vb metals of the Periodic Table and from the rare earth metals, the limiting values of x, y and z being functions of the nature of the substituting elements M and M', and wherein x plus y is greater than zero.

2. Compositions according to claim 1, characterized in that they correspond to the formula (II):

$$(Bi_2O_2)(V_{1-y}M_y'O_z) \qquad (II)$$

in which: M' is as defined previously, and is a number other than zero.

3. Compositions according to claim 1, characterized in that they correspond to the formula III:

$$(Bi_{2-x}M_xO_2)(VO_2) \qquad (III)$$

in which M is as defined previously, and is a number other than zero.

4. Compositions according to claim 3, characterized in that M represents lanthanum.

5. Compositions according to claim 1, characterized in that they correspond to formula (I), in which both x and y are other than zero.

6. Solid conducting electrolytes using $O^{2-}$ anions, characterized in that they are developed from at least one composition according to claims 1, 2, 3, 4, or 5.

* * * * *